US012126567B2

(12) United States Patent
Sun et al.

(10) Patent No.: US 12,126,567 B2
(45) Date of Patent: Oct. 22, 2024

(54) MULTIPLE BIT FEEDBACK CHANNEL

(71) Applicant: QUALCOMM Incorporated, San Diego, CA (US)

(72) Inventors: Jing Sun, San Diego, CA (US); Xiaoxia Zhang, San Diego, CA (US); Tao Luo, San Diego, CA (US); Sony Akkarakaran, Poway, CA (US); Yisheng Xue, San Diego, CA (US); Juan Montojo, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 113 days.

(21) Appl. No.: 17/450,242

(22) Filed: Oct. 7, 2021

(65) Prior Publication Data

US 2022/0150027 A1 May 12, 2022

Related U.S. Application Data

(60) Provisional application No. 63/112,372, filed on Nov. 11, 2020.

(51) Int. Cl.
*H04L 5/00* (2006.01)
*H04W 72/04* (2023.01)
(52) U.S. Cl.
CPC .......... *H04L 5/0055* (2013.01); *H04W 72/04* (2013.01)
(58) Field of Classification Search
CPC ....... H04L 5/0055; H04L 5/0053; H04L 5/00; H04L 1/0001; H04W 72/04; H04W 72/12; H04W 16/00; H04W 36/06; H04B 7/024
See application file for complete search history.

(56) References Cited

U.S. PATENT DOCUMENTS

2020/0099479 A1* 3/2020 Park .................... H04W 4/70
2020/0305126 A1* 9/2020 Li ...................... H04L 1/1614
(Continued)

OTHER PUBLICATIONS

CMCC: "Remaining Issues on Physical Layer Procedures for Sidelink", 3GPP TSG RAN WG1 #100bis, 3GPP Draft, R1-2002207, 3rd Generation Partnership Project (3GPP), Mobile Competence Centre, 650, Route Des Lucioles, F-06921 Sophia-Antipolis Cedex, France, RAN WG1, No. e-Meeting, Apr. 20, 2020-Apr. 30, 2020, Apr. 11, 2020 (Apr. 11, 2020), pp. 1-7, XP051875486, Retrieved from the Internet: URL: https://ftp.3gpp.org/tsg_ran/WG1_RL1/TSGR1_100b_e/Docs/R1-2002207.zip, R1-2002207.docx [retrieved on Apr. 11, 2020] p. 2-p. 3.
(Continued)

*Primary Examiner* — Ian N Moore
*Assistant Examiner* — Brian T Le
(74) *Attorney, Agent, or Firm* — Patterson & Sheridan, L.L.P.

(57) ABSTRACT

Techniques and apparatus for a resource pool configuration for multiple bits physical sidelink feedback channel (PSFCH) are described. An example technique includes receiving a plurality of transmissions from a user equipment (UE) on a plurality of sidelink subchannels. At least one resource set for transmitting feedback corresponding to the plurality of transmissions is determined, based on at least one of the plurality of transmissions. Feedback corresponding to the plurality of transmissions is transmitted using the at least one resource set. Another example technique includes sending a plurality of transmissions to a UE on a plurality of sidelink subchannels and monitoring for feedback corresponding to the plurality of transmissions, based on a codebook size associated with the feedback.

24 Claims, 12 Drawing Sheets

(56) References Cited

U.S. PATENT DOCUMENTS

| | | | |
|---|---|---|---|
| 2021/0007096 A1* | 1/2021 | Huang | H04L 5/0055 |
| 2021/0112544 A1* | 4/2021 | Chen | H04W 52/242 |
| 2022/0224457 A1* | 7/2022 | Ebrahim Rezagah | H04L 1/08 |
| 2022/0368502 A1* | 11/2022 | Son | H04W 4/40 |
| 2022/0394702 A1* | 12/2022 | Lee | H04L 1/1812 |

OTHER PUBLICATIONS

International Search Report and Written Opinion—PCT/US2021/054224—ISA/EPO—Jan. 18, 2022.

LG Electronics: "Discussion on Physical Layer Structure for NR Sidelink", 3GPP Draft, 3GPP TSG RAN WG1 #97, R1-1907012, Discussion on Physical Layer Structure for NR Sidelink, 3RD Generation Partnership Project (3GPP), Mobile Competence Centre, 650, Route Des Lucioles, F-06921, Sophia-Antipolis Cedex, France, vol. RAN WG1, No. Reno, USA, May 13, 2019-May 17, 2019, May 13, 2019 (May 13, 2019), XP051728460, 25 Pages.

* cited by examiner

MULTIPLE BIT FEEDBACK CHANNEL

CROSS-REFERENCE TO RELATED APPLICATION

This application claims the benefit of and priority to U.S. Provisional Application No. 63/112,372, filed Nov. 11, 2020, which is assigned to the assignee hereof and hereby expressly incorporated by reference herein in its entirety.

BACKGROUND

I. Field of the Disclosure

Aspects of the present disclosure relate to wireless communications, and more particularly, to techniques for transmitting feedback via a multiple bit physical sidelink feedback channel (PSFCH).

II. Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation (CA).

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved transmission of feedback information using sidelink communication channels.

Certain aspects of the subject matter described in this disclosure can be implemented in a method for wireless communication by a first user equipment (UE). The method generally includes receiving a plurality of transmissions from a second UE on a plurality of sidelink sub-channels. The method also includes determining at least one resource set for transmitting feedback corresponding to the plurality of transmissions, based on at least one of the plurality of transmissions. The method further includes transmitting the feedback corresponding to the plurality of transmissions using the at least one resource set.

Certain aspects of the subject matter described in this disclosure can be implemented in an apparatus for wireless communication. The apparatus may include a receiver, a transmitter, at least one processor, and a memory coupled to the at least one processor. The receiver is configured to receive a plurality of transmissions from another apparatus on a plurality of sidelink sub-channels. The at least one processor is configured to determine at least one resource set for transmitting feedback corresponding to the plurality of transmissions, based on at least one of the plurality of transmissions. The transmitter is configured to transmit feedback corresponding to the plurality of transmissions using the at least one resource set.

Certain aspects of the subject matter described in this disclosure can be implemented in an apparatus for wireless communication. The apparatus includes means for receiving a plurality of transmissions from another apparatus on a plurality of sidelink sub-channels. The apparatus also includes means for determining at least one resource set for transmitting feedback corresponding to the plurality of transmissions, based on at least one of the plurality of transmissions. The apparatus further includes means for transmitting the feedback corresponding to the plurality of transmissions using the at least one resource set.

Certain aspects of the subject matter described in this disclosure can be implemented in an apparatus for wireless communication. The apparatus includes means for receiving a plurality of transmissions from another apparatus on a plurality of sidelink sub-channels. The apparatus also includes means for determining at least one resource set for transmitting feedback corresponding to the plurality of transmissions, based on at least one of the plurality of transmissions. The apparatus further includes means for transmitting the feedback corresponding to the plurality of transmissions using the at least one resource set.

Certain aspects of the subject matter described in this disclosure can be implemented in a computer-readable medium for wireless communication by a first UE. The computer-readable medium includes computer-executable instructions that, when executed by one or more processors of a processing system, cause the processing system to: receive a plurality of transmissions from a second UE on a plurality of sidelink sub-channels; determine at least one resource set for transmitting feedback corresponding to the plurality of transmissions, based on at least one of the plurality of transmissions; and transmit the feedback corresponding to the plurality of transmissions using the at least one resource set.

Certain aspects of the subject matter described in this disclosure can be implemented in a method for wireless communication by a first UE. The method generally includes sending a plurality of transmissions to a second UE on a plurality of sidelink subchannels. The method also includes monitoring for feedback corresponding to the plurality of transmissions, from the second UE, based on a codebook size associated with the feedback.

Certain aspects of the subject matter described in this disclosure can be implemented in an apparatus for wireless communication. The apparatus may include a transmitter, at least one processor, and a memory coupled to the at least one processor. The transmitter is configured to send a plurality of transmissions to another apparatus on a plurality of sidelink subchannels. The at least one processor is configured to monitor for feedback corresponding to the plurality of transmissions, from the other apparatus, based on a codebook size associated with the feedback.

Certain aspects of the subject matter described in this disclosure can be implemented in an apparatus for wireless communication. The apparatus includes means for sending a plurality of transmissions to another apparatus on a plurality of sidelink subchannels. The apparatus also includes means for monitoring for feedback corresponding to the plurality of transmissions, from the other apparatus, based on a codebook size associated with the feedback.

Certain aspects of the subject matter described in this disclosure can be implemented in a computer-readable medium for wireless communication by a first UE. The computer-readable medium includes computer-executable instructions that, when executed by one or more processors of a processing system, cause the processing system to: send a plurality of transmissions to a second UE on a plurality of sidelink subchannels; and monitor for feedback corresponding to the plurality of transmissions, from the second UE, based on a codebook size associated with the feedback.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
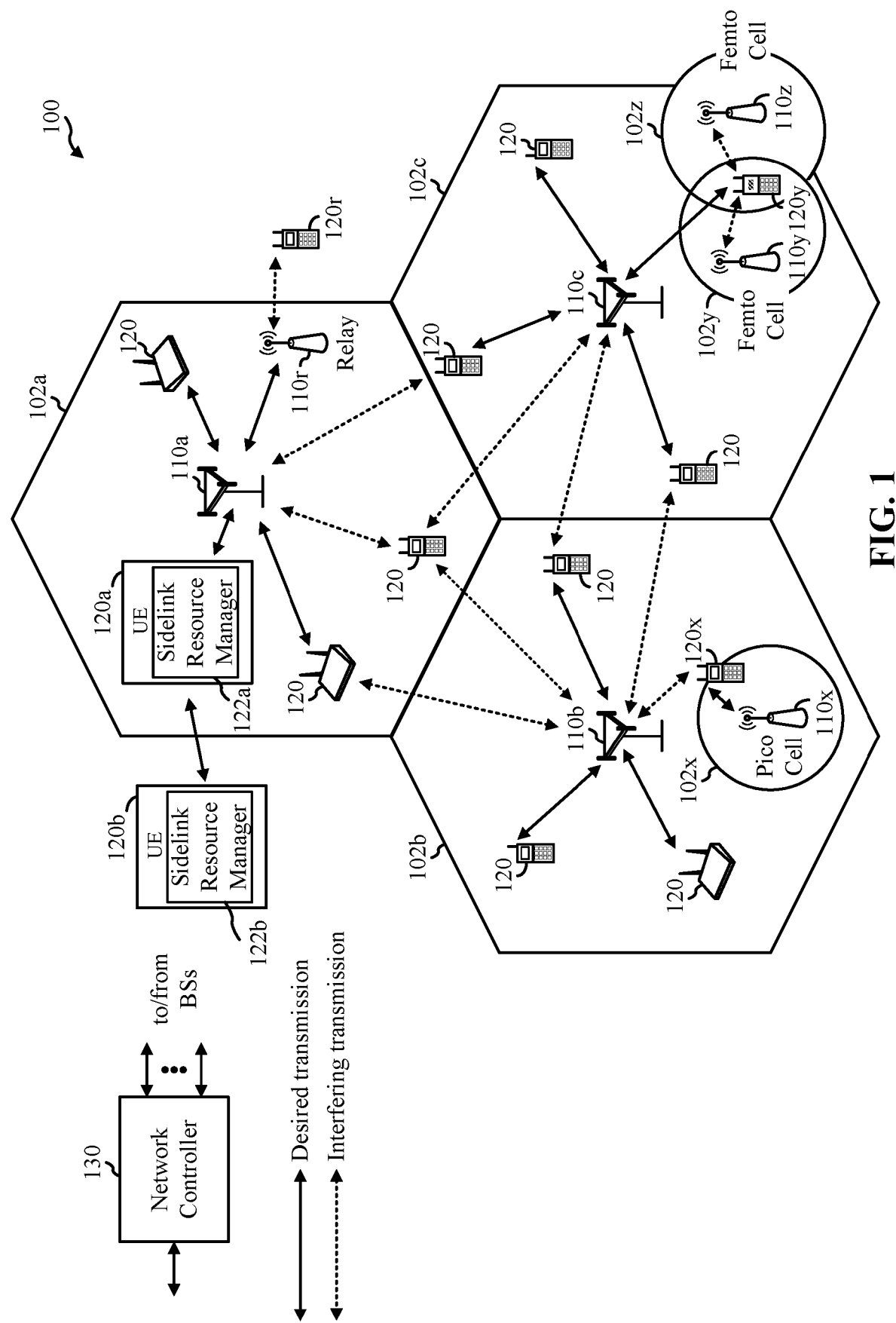
FIG. 1 is a block diagram conceptually illustrating an example wireless communication network, in accordance with certain aspects of the present disclosure.

Aspects of the present disclosure provide apparatus, methods, processing systems, and computer readable mediums for transmitting sidelink feedback using a multiple bit physical sidelink feedback channel (PSFCH).

Certain wireless communication systems may allow user equipments (UEs) to communicate with each other using sidelink communication links (or sidelink communication channels). For example, a first UE may receive one or more physical sidelink shared channels (PSSCHs) from one or more second UEs. In scenarios where the first UE receives multiple PSSCHs (e.g., a continuous stream of PSSCHs), the first UE may have to transmit multiple physical sidelink feedback channels (PSFCHs) in order to acknowledge the multiple PSSCHs. In some cases, sending multiple PSFCHs in this manner can impact the performance of the communication network, e.g., by reducing network throughput.

To address this, aspects described herein provide techniques for acknowledging multiple PSSCHs using a multiple bit PSFCH (e.g., a single PSFCH with multiple bits). As described below, a receiving UE may receive multiple sidelink transmissions from a transmitting UE on multiple sidelink subchannels. The receiving UE may determine at least one resource set for transmitting feedback corresponding to the multiple sidelink transmissions, based on at least one of the multiple sidelink transmissions. The receiving UE may then transmit the feedback corresponding to the multiple sidelink transmissions using the at least one resource set. By allowing a receiving UE to acknowledge multiple sidelink transmisions using a single, multi-bit sidelink feedback channel, aspects described herein can significantly increase the efficiency and performance of the communication network.

The following description provides examples of transmitting feedback for sidelink transmissions in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 includes one or more base station (BSs) 110*a-z* (each also individually referred to herein as BS 110 or collectively as BSs 110) and/or user equipment (UE) 120*a-y* (each also individually referred to herein as UE 120 or collectively as UEs 120).

According to certain aspects, the UEs 120 may be configured for sidelink communications. As shown in FIG. 1, the UE 120*a* includes a sidelink resource manager 122*a* and the UE 120*b* includes a sidelink resource manager 122*b*. In some aspects, UEs 120*a* and/or 120*b* may be receiving sidelink communications and may use their respective sidelink resource managers to transmit feedback acknowledging the sidelink communications. For example, using sidelink resource manager 122*a* (or sidelink resource manager 122*b*), UE 120*a* (or UE 120*b*) may receive a plurality of transmissions from another UE on a plurality of sidelink subchannels; determine at least one resource set for transmitting feedback corresponding to the plurality of transmissions, based on at least one of the plurality of transmissions; and transmit to the other UE the feedback corresponding to the plurality of transmissions using the at least one resource set.

Additionally or alternatively, using sidelink resource manager 122*a* (or sidelink resource manager 122*b*), UE 120*a* (or UE 120*b*) may send a plurality of transmissions to another UE on a plurality of sidelink subchannels; and monitor for feedback corresponding to the plurality of transmissions, from the other UE, based on a codebook size associated with the feedback.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120 in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network (not shown) (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
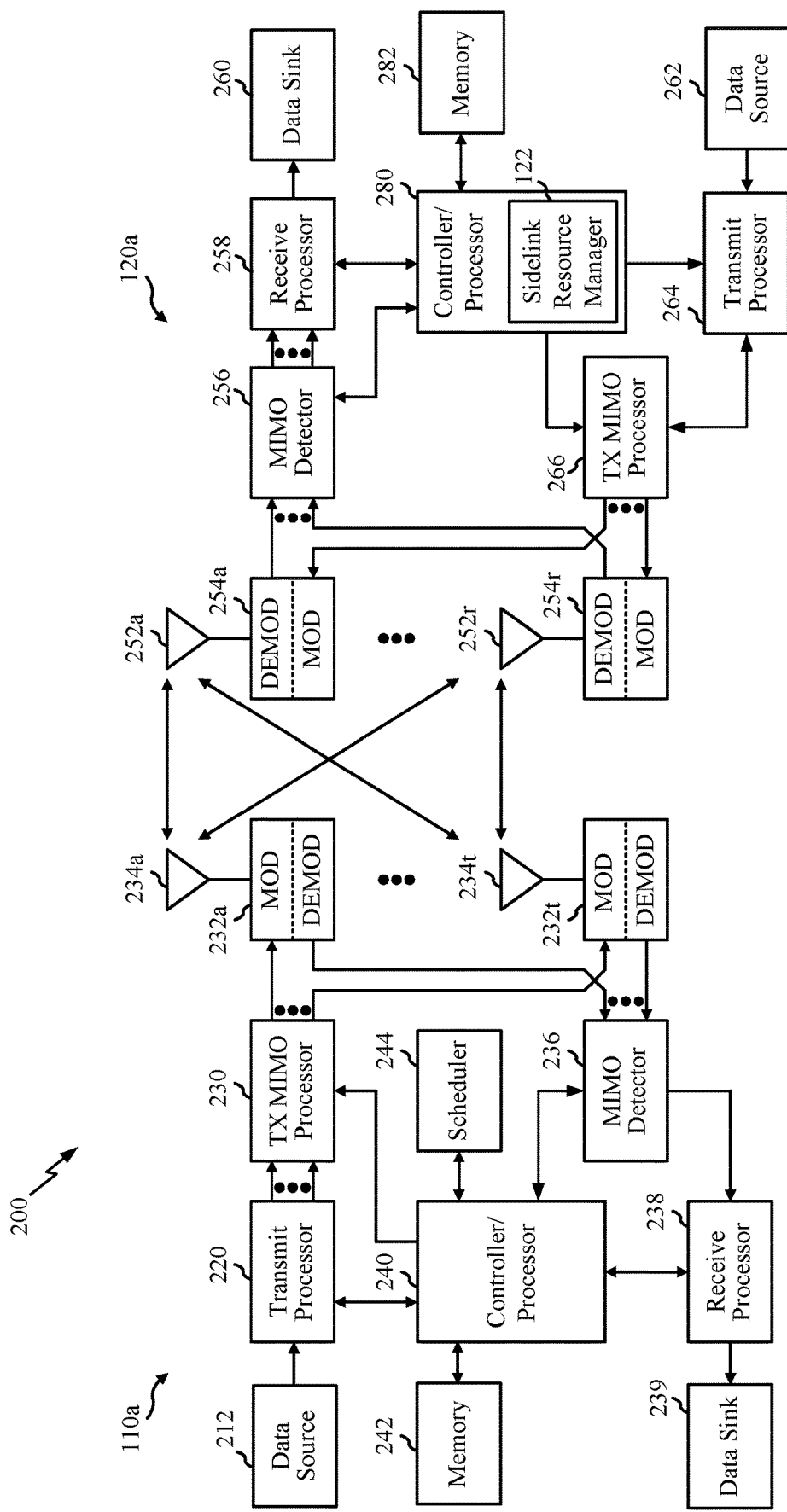
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid automatic repeat request (ARQ) indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the demodulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 280 of the UE 120 (e.g., UE 120a) has a sidelink resource manager 122, which is configured to implement one or more techniques described herein for supporting sidelink feedback via a multiple bit PSFCH. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
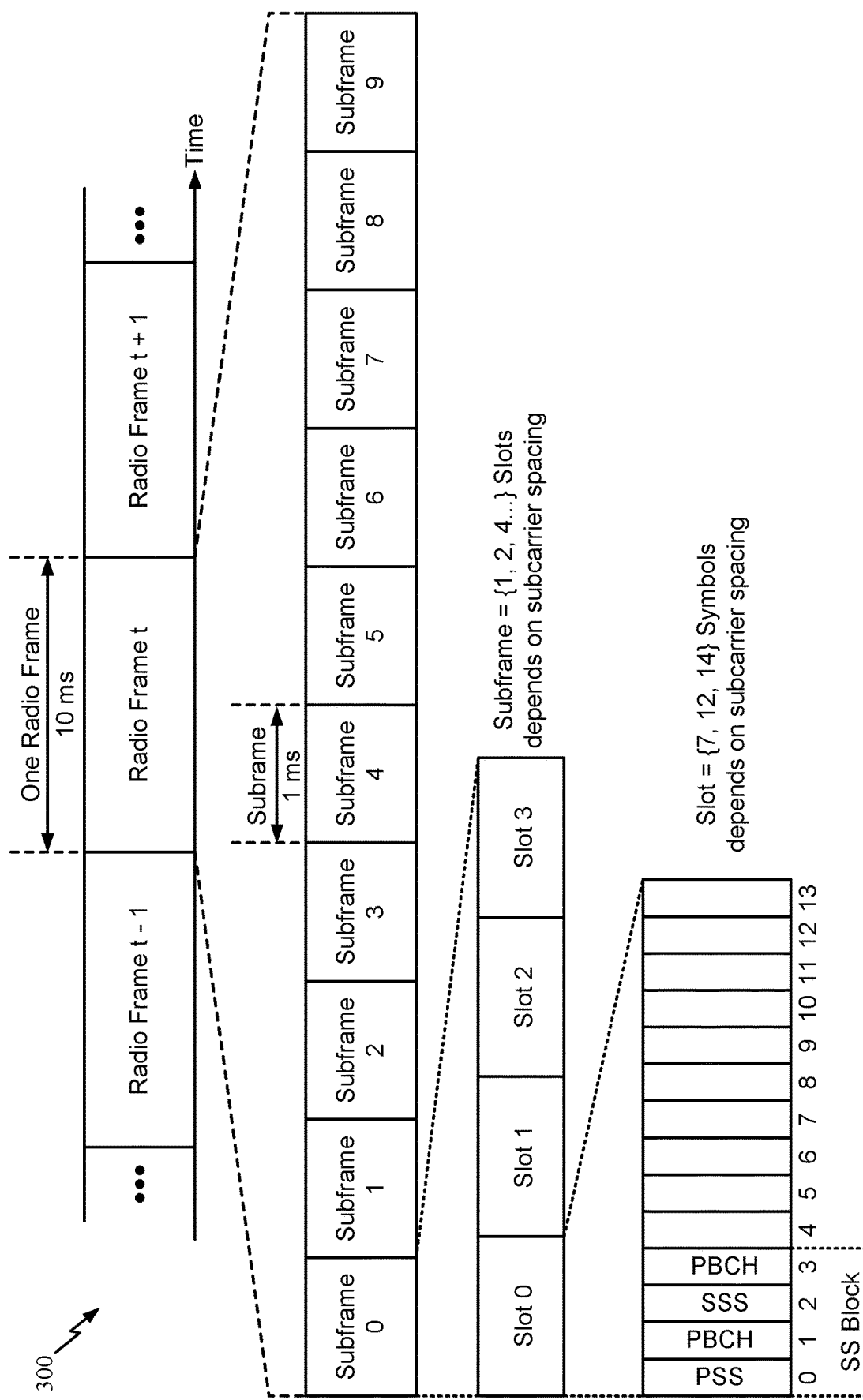
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A sub-slot structure may refer to a transmit time interval having a duration less than a slot (e.g., 2, 3, or 4 symbols). Each symbol in a slot may be configured for a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SSS may provide the CP length and frame timing. The PSS and SSS may provide the cell identity. The PBCH carries some basic system information, such as downlink system bandwidth, timing information within radio frame, synchronization signal (SS) burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

In some examples, the communication between the UEs 120 and BSs 110 is referred to as the access link. The access link may be provided via a Uu interface. Communication between devices may be referred as the sidelink.

In some examples, two or more subordinate entities (e.g., UEs 120) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE 120a) to another subordinate entity (e.g., another UE 120) without relaying that communication through the scheduling entity (e.g., UE 120 or BS 110), even though the scheduling entity may be utilized for scheduling and/or control purposes. In some examples, the sidelink signals may be communicated using a licensed spectrum (unlike wireless local area networks, which typically use an unlicensed spectrum). One example of sidelink communication is PC5, for example, as used in V2V, LTE, and/or NR.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations, resource reservations, and other parameters used for data transmissions, and the PSSCH may carry the data transmissions. The PSFCH may carry feedback, such as channel state information (CSI) related to a sidelink channel quality, acknowledgment information (e.g., acknowledgement (ACK), negative acknowledgment (NACK), etc.) for a PSSCH transmission, etc. In some systems (e.g., NR Release 16), a two stage sidelink control information (SCI) may be supported. Two stage SCI may include a first stage SCI (SCI-1) and a second stage SCI (e.g., SCI-2). SCI-1 may include resource reservation and allocation information, information that can be used to decode SCI-2, etc. SCI-2 may include information that can be used to decode data and to determine whether the UE is an intended recipient of the transmission. SCI-1 and/or SCI-2 may be transmitted over PSCCH.

Figure 4:
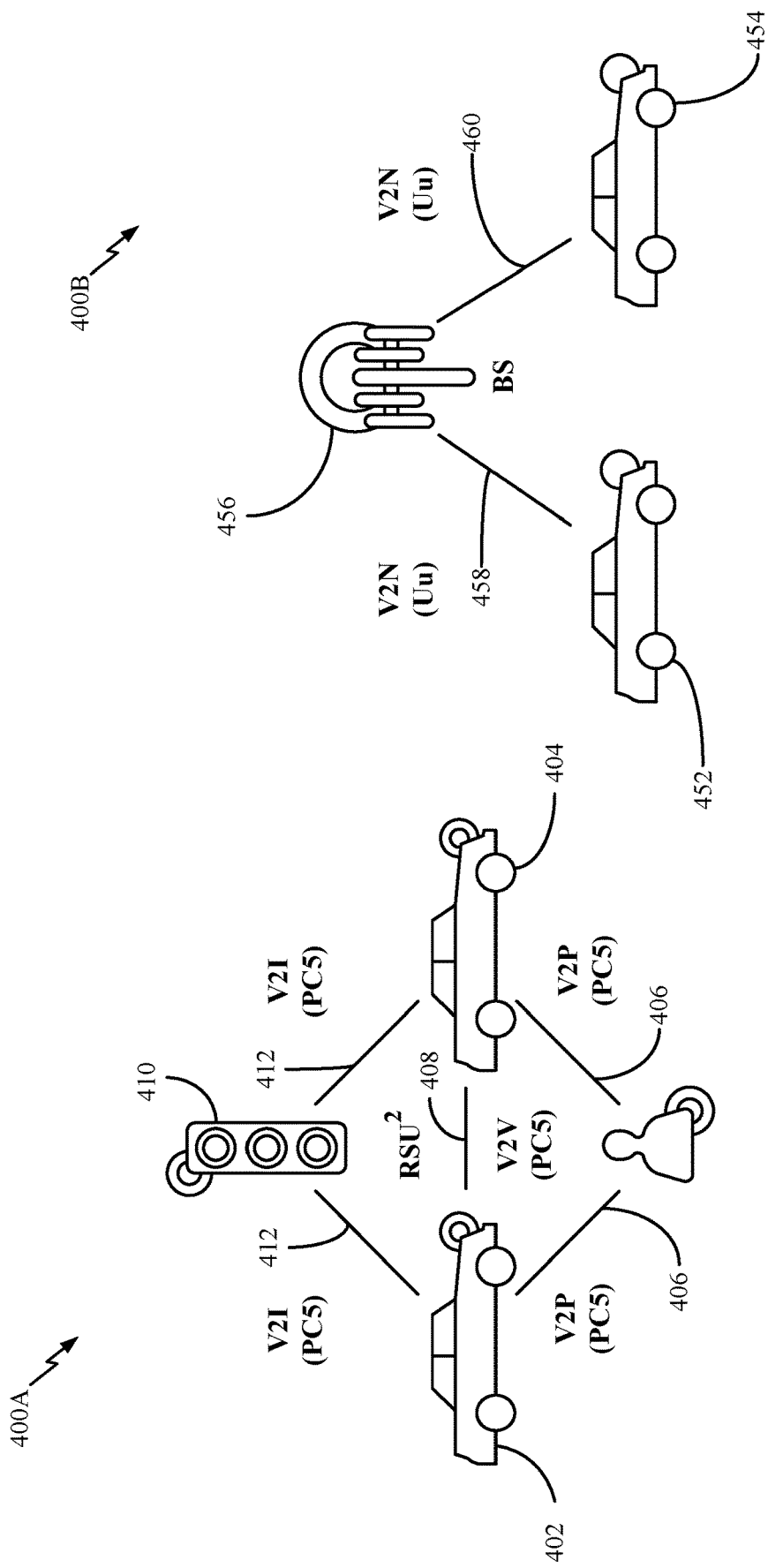
FIGS. 4A and 4B show diagrammatic representations of example vehicle to everything (V2X) systems, in accordance with certain aspects of the present disclosure.

FIG. 4A and FIG. 4B show diagrammatic representations of example V2X systems, in accordance with some aspects of the present disclosure. For example, the vehicles shown in FIG. 4A and FIG. 4B may communicate via sidelink channels and may manage resource reservations and/or release of resource reservations as described herein.

The V2X systems, provided in FIG. 4A and FIG. 4B provide two complementary transmission modes. A first transmission mode, shown by way of example in FIG. 4A, involves direct communications (for example, also referred to as side link communications) between participants in proximity to one another in a local area. A second transmission mode, shown by way of example in FIG. 4B, involves network communications through a network, which may be implemented over a Uu interface (for example, a wireless communication interface between a radio access network (RAN) and a UE).

Referring to FIG. 4A, a V2X system 400A (for example, including vehicle to vehicle (V2V) communications) is illustrated with two vehicles 402, 404. The first transmission mode allows for direct communication between different participants in a given geographic location. As illustrated, a vehicle can have a wireless communication link 406 with an individual (V2P) (for example, via a UE) through a PC5 interface. Communications between the vehicles 402 and 404 may also occur through a PC5 interface 408. In a like manner, communication may occur from a vehicle 402 to other highway components (for example, highway component 410), such as a traffic signal or sign (V2I) through a PC5 interface 412. With respect to each communication link illustrated in FIG. 4A, two-way communication may take place between elements, therefore each element may be a transmitter and a receiver of information. The V2X system 400A may be a self-managed system implemented without assistance from a network entity. A self-managed system may enable improved spectral efficiency, reduced cost, and increased reliability as network service interruptions do not occur during handover operations for moving vehicles. The V2X system 400A may be configured to operate in a licensed or unlicensed spectrum, thus any vehicle with an equipped system may access a common frequency and share information. Such harmonized/common spectrum operations allow for safe and reliable operation.

FIG. 4B shows a V2X system 400B for communication between a vehicle 452 and a vehicle 454 through a network entity 456. These network communications may occur through discrete nodes, such as a base station (for example, an eNB or gNB), that sends and receives information to and from (for example, relays information between) vehicles 452, 454. The network communications through vehicle to network (V2N) links 458 and 460 may be used, for example, for long range communications between vehicles, such as for communicating the presence of a car accident a distance ahead along a road or highway. Other types of communications may be sent by the node to vehicles, such as traffic flow conditions, road hazard warnings, environmental/weather reports, and service station availability, among other examples. Such data can be obtained from cloud-based sharing services.

In communication systems that support sidelink communications (e.g., Release 16 Sidelink), a UE can send one or more sidelink transmissions (e.g., PSCCH/PSSCH transmission(s)) to one or more other UEs. In some scenarios, for PSCCH/PSSCH transmission, feedback (e.g., ACK/NACK) for PSSCH can be requested to be transmitted in PSFCH. A PSFCH resource can be selected from a resource pool, which may not be a dedicated PSFCH resource pool. For example, a UE can receive an indication (via an SCI format scheduling a PSSCH reception in one or more sub-channels from a number of $N_{subch}^{PSSCH}$ sub-channels) to transmit a PSFCH with hybrid automatic repeat request (HARQ)-ACK information in response to the PSSCH reception. The UE can provide within the PSFCH HARQ-ACK information that includes ACK or NACK.

Given a PSSCH location, the UE can identify resource(s) for the PSFCH transmission. For example, the UE can be provided, by sl-PSFCH-Period-r16 (also referred to as periodPSFCHresource), a number of slots in a resource pool for a period of PSFCH transmission occasion resources. The number of supported slots can be 0, 1, 2, or 4. If the number is zero, PSFCH transmissions from the UE in the resource pool may be disabled. The PSFCH transmission timing is generally based on the first slot with a PSFCH resource after PSSCH and after a "MinTimeGapPSFCH" after the PSSCH. For example, if a UE receives a PSSCH in a resource pool and the HARQ feedback enabled/disabled indicator field in an associated SCI format 2-A or a SCI format 2-B has value 1, the UE may provide the HARQ-ACK information in a PSFCH transmission in the resource pool. The UE can transmit the PSFCH in a first slot that includes PSFCH resources and is at least a number of slots, provided by sl-MinTimeGapPSFCH-r16, of the resource pool after a last slot of the PSSCH reception.

The parameter $M_{PRB,set}^{PSSCH}$: rbSetPSFCH defines a set of physical resource blocks (PRBs) for PSFCH in a slot. $M_{PRB,set}^{PSFCH}$ may be split between $N_{PSSCH}^{PSSCH}$ (Number of PSSCH slots corresponds to the PSFCH slot) and $N_{subch}$ of PSSCH in a slot. There may be a time-first mapping from a PSSCH resource to PSFCH PRBs.

A UE can be provided by sl-PSFCH-RB-Set-r16 a set of $M_{PRB,set}^{PSFCH}$ PRBs in a resource pool for PSFCH transmission in a PRB of the resource pool. For a number of $N_{subch}$ subchannels for the resource pool, provided by sl-NumSubchannel, and a number of PSSCH slots associated with a PSFCH slot that is less than or equal to $N_{PSSCH}^{PSFCH}$, the UE may allocate the $[(i+j \cdot N_{PSSCH}^{PSFCH}) \cdot M_{subch,slot}^{PSFCH}, (i+1+j \cdot N_{PSSCH}^{PSFCH}) \cdot M_{subch,slot}^{PSFCH} -1]$ PRBs from the $M_{PRB,set}^{PSFCH}$ PRBs to slot i among the PSSCH slots associated with the PSFCH slot and sub-channel j, where $M_{subch,slot}^{PSSCH} = M_{PRB,set}^{PSFCH} / (N_{sub^{ch}} \cdot N_{PSSCH}^{PSFCH})$, $0 \leq i < N_{PSSCH}^{PSFCH}$, $0 \leq j < N_{sub^{ch}}$, allocation starts and the in an ascending order of i and continues in an ascending order of j. $M_{PRB,set}^{PSFCH}$ may be a multiple of $N_{sub^{ch}} \cdot N_{PSSCH}^{PSFCH}$.

The PSFCH resource pool may have a size $R_{PRB,CS}^{PSFCH} = N_{type}^{PSFCH} \times N_{CS}^{PSFCH} \times M_{subch,slot}^{PSFCH}$. For example, the UE may determine a number of PSFCH resources available for multiplexing HARQ-ACK information in a PSFCH transmission as $R_{PRB,CS}^{PSSCH=} N_{type}^{PSFCH} \cdot M_{subch,slot}^{PSFCH} \cdot N_{CS}^{PSFCH}$ where $N_{CS}^{PSFCH}$ is a number of cyclic shift (CS) pairs for the resource pool (the pair is for ACK/NACK, 1 bit), and (1) $N_{type}^{PSFCH}=1$ and the $M_{subch,slot}^{PSFCH}$ PRBs are associated with the starting sub-channel of the corresponding PSSCH or (2) $N_{type}^{PSFCH}=M_{subch}^{PSSCH}$ and the $N_{subch}^{PSSCH}$. $M_{subch,slot}^{PSFCH}$ PRBs are associated with one or more sub-channels from the $N_{subch}^{PSSCH}$ sub-channels of the corresponding PSSCH. The PSFCH resources may be first indexed according to an ascending order of the PRB index, from the $N_{type}^{PSFCH} \cdot M_{subch,slot}^{PSFCH}$ and then according to an ascending order of the cyclic shift pair index from the $N_{CS}^{PSFCH}$ cyclic shift pairs.

The UE can determine an index of a PSFCH resource for a PSFCH transmission in response to a PSSCH reception as $(P_{ID}+M_{ID})\bmod R_{PRB,CS}^{PSSCH}$ where $P_{ID}$ is a physical layer source ID provided by SCI format 2-A or 2-B scheduling the PSSCH reception, and $M_{ID}$ is the identity of the UE receiving the PSSCH as indicated by higher layers if the UE detects a SCI format 2-A with Cast type indicator field value of "01"; otherwise, $M_{ID}$ is zero. In one example, for a unicast or NACK based transmission, $M_{ID}$ is zero and the UE may send ACK/NACK or NACK only at a source ID dependent resource in the pool. In another example, for a groupcast based transmission, each destination ID can pick a single resource in the pool and transmit ACK/NACK.

Figure 5:
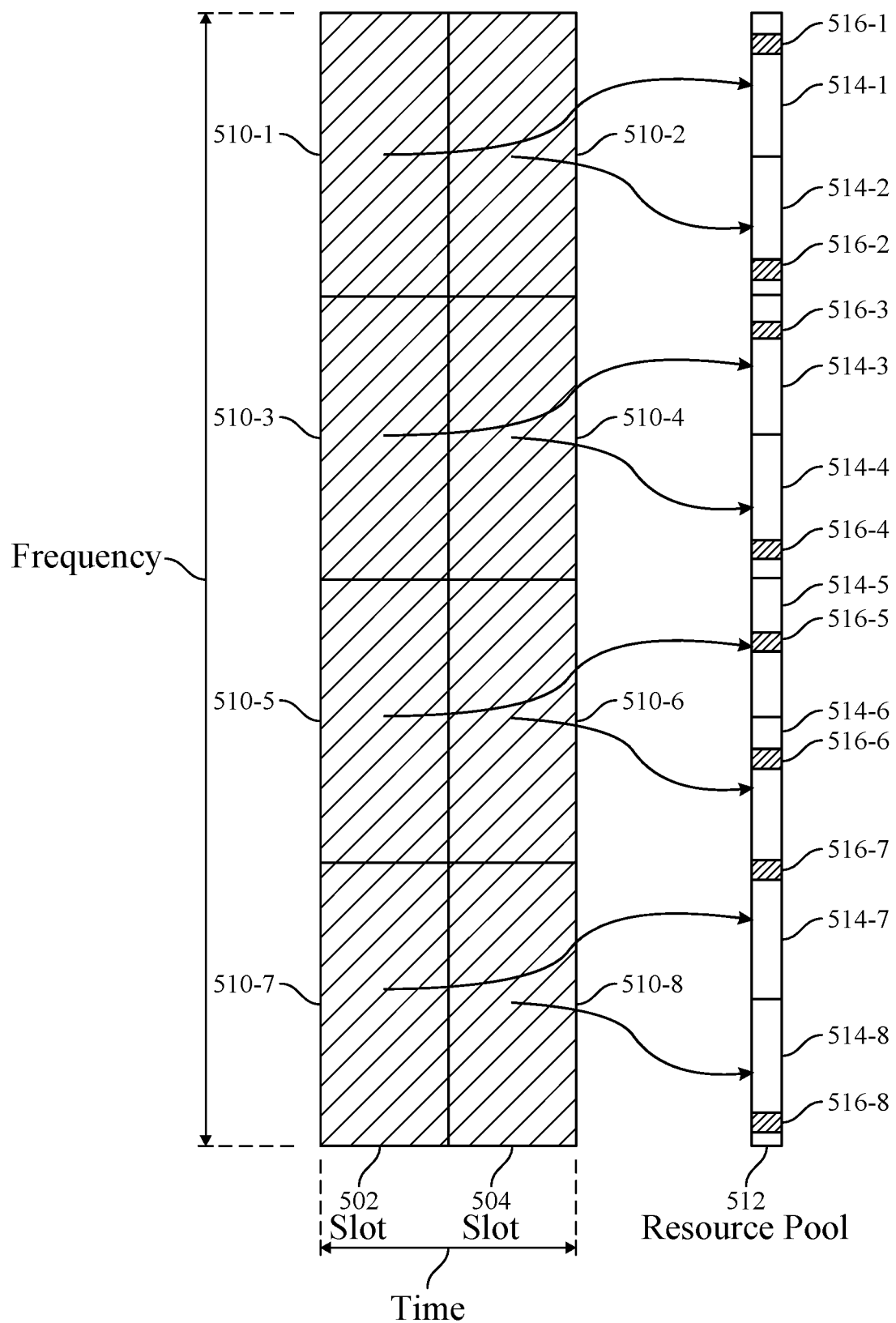
FIG. 5 illustrates an example design for transmitting sidelink feedback.

FIG. 5 illustrates a reference example design for transmitting sidelink feedback using a PSFCH. Here, the UE is configured with a PSFCH resource pool 512 for PSCCH/PSSCH slots 502, 504. That is, periodPSFCHresource=2, such that every two slots maps to one occasion of the PSFCH resource pool 512. The occasion of the PSFCH resource pool 512 may be during one or more symbols of slot 504.

Each slot 502, 504 includes four subchannels 510. In particular, slot 502 includes subchannels 510-1, 510-3, 510-5, and 510-7, and slot 504 includes subchannels 510-2, 510-4, 510-6, and 510-8. Each subchannel 510 is associated with a different sub-resourcepool 514 (also referred to as a subset of PSFCH resources) of the PSFCH resource pool 512 (also referred to as a set of PSFCH resources). For example, subchannel 510-1 is associated with sub-resourcepool 514-1, subchannel 510-2 is associated with sub-resourcepool 514-2, subchannel 510-3 is associated with sub-resource pool 514-3, subchannel 510-4 is associated with sub-resource pool 514-4, subchannel 510-5 is associated with sub-resource pool 515-5, subchannel 510-6 is associated with sub-resource pool 515-6, subchannel 510-7 is associated with sub-resource pool 515-7, and subchannel 510-8 is associated with sub-resource pool 515-8.

The number of PSFCH resources (e.g., PRBs) in the PSFCH resource pool 512 may be $R_{PRB,CS}^{PSFCH}$ and each sub-resource pool 514 may include $M_{subch,slot}^{PSFCH}$ PRBs (e.g., from $M_{PRB,set}^{PSFCH}$ PRBs). For a given subchannel 510, the UE may determine a PRB 516 within the respective sub-resource pool 514 (associated with the subchannel 510) to use for transmitting sidelink feedback (e.g., HARQ-ACK information based on $(P_{ID}+M_{ID})$mod $R_{PRB,CS}^{PSFCH}$.

As shown in FIG. 5, for example, the UE may select PRB 516-1 (within sub-resource pool 514-1) for transmitting sidelink feedback for a sidelink transmission associated with subchannel 510-1, select PRB 516-2 (within sub-resource pool 514-2) for transmitting sidelink feedback for a sidelink transmission associated with subchannel 510-2, select PRB 516-3 (within sub-resource pool 514-3) for transmitting sidelink feedback for a sidelink transmission associated with subchannel 510-3, select PRB 516-4 (within sub-resource pool 514-4) for transmitting sidelink feedback for a sidelink transmission associated with subchannel 510-4, select PRB 516-5 (within sub-resource pool 514-5) for transmitting sidelink feedback for a sidelink transmission associated with subchannel 510-5, select PRB 516-6 (within sub-resource pool 514-6) for transmitting sidelink feedback for a sidelink transmission associated with subchannel 510-6, select PRB 516-7 (within sub-resource pool 514-7) for transmitting sidelink feedback for a sidelink transmission associated with subchannel 510-7, and select PRB 516-8 (within sub-resource pool 514-8) for transmitting sidelink feedback for a sidelink transmission associated with subchannel 510-8.

One issue with the sidelink feedback design illustrated in FIG. 5 is that it may not support transmitting a PSFCH with multiple bits. For example, each PSFCH (e.g., PRB 516) may be a single RB single symbol and may have a format similar to (or same as) PUCCH format 0. Thus, each PSFCH can carry a single bit, but may not be used for transmitting multiple bits. In cases where a UE has to send multiple bits of HARQ-ACK information, the UE may have to frequency division multiplex (FDM) multiple PSFCH in order to acknowledge multiple sidelink data (PSSCH) transmissions. This scenario can occur, for example, when the UE has received multiple PSSCHs from the same source UE, where the PSSCHs have PSFCH hashed to the same PSFCH location. In another example, transmitting FDM multiple PSFCH can occur when the PSFCH occasion period is 2 or 4. In yet another example, transmitting FDM multiple PSFCH can occur when the UE has received multiple PSSCH from different source UEs and is requested to send PSFCH to each of the different source UEs. The number of PSFCH that a UE can multiplex in the same symbol may be based on a UE capability.

As the number of communication services (e.g., eMBB, CA, unlicensed spectrum, etc.) that support sidelink communication increases, there may a greater number of occurrences where the UE has to transmit FDM multiple PSFCH in order to acknowledge multiple sidelink data transmissions. In the case of eMBB, for example, the same destination node (e.g., UE) may receive a continuous stream of PSSCHs from one or more source nodes. As another example, certain CA scenarios may lead to a large number of ACK/NACK bits being fed back to the source node(s). In yet another example, as sidelink communications moves to the unlicensed band, it may not be possible to configure a sufficient number of PSFCH opportunities to allow for acknowledging a continuous stream of sidelink data transmissions (e.g., the possible PSFCH transmission(s) may have to be more sparse than the specified number PSFCH period).

Accordingly, it may be desirable to provide techniques and apparatus that enable transmission of multiple bits of HARQ-ACK information within a single PSFCH in order to acknowledge multiple sidelink data (e.g., PSSCH) transmissions.

Example Resource Pool Configuration for Multiple Bits Physical Sidelink Feedback Channel Aspects described herein provide techniques that enable transmission of a PSFCH with multiple bits, e.g., for acknowledging multiple sidelink data transmissions. As described below, using the techniques presented herein, a destination (or receiving) UE can send multiple bits of HARQ-ACK information to a source (or transmitting) UE. The multiple bits of HARQ-ACK information may correspond to multiple PSSCHs from the source UE (e.g., each bit of the multiple bits may correspond to (acknowledge) a different PSSCH of the multiple PSSCHs). Additionally, in cases where one or more previous HARQ-ACK transmissions fail (e.g., due to listen-before-talk (LBT) failure for NR-U), one or more of the multiple bits of the HARQ-ACK information can be used for re-transmission of the HARQ-ACK information.

In some aspects, a single-bit PSFCH design (e.g., in Release 16) may be extended to support multiple bits. For example, a single-bit PSFCH design may be based on NR PUCCH format 0 with 1 symbol. In some aspects, the multi-bit PSFCH design described herein can support multiple bits by extending PUCCH format 2 from NR to sidelink PSFCH. In one aspect, the PUCCH format 2 includes a single symbol (similar to PUCCH format 0) (with one additional symbol for automatic gain control (AGC), but the single symbol in PUCCH format 2 can support multiple RBs and can handle a large payload, relative to PUCCH format 0.

In some aspects, a multi-bit PSFCH can be supported for unicast transmission, but may not be supported for group cast transmissions or zone based transmissions. Additionally, in some aspects, the UE may not provide HARQ feedback for a broadcast transmission. The UE may receive SCI that indicates whether the transmission is unicast, groupcast, or broadcast. For example, in Release 16 sidelink (SL), SCI2-A includes a cast type indicator that explicitly indicates whether the transmission is unicast, groupcast, or broadcast. In another example, SCI2-B can indicate whether the transmission is zone based.

If the UE receives SCI that indicates group cast (SCI2-A) or zone based (SCI2-B), the UE may use the legacy single bit PSFCH to acknowledge the group cast or zone based transmission. On the other hand, if the receiving UE receives an indication (e.g., in SCI) of a unicast transmission, the receiving UE can collect HARQ feedback (e.g., ACK(s)/NACK(s)) for multiple PSSCH and can multiplex the HARQ feedback together to transmit in a multi-bit PSFCH. In some aspects, if the UE receives one or more groupcast PSSCH and one or more unicast PSSCH, the UE can group the unicast PSSCH HARQ feedback together into one multi-bit PSFCH transmission, and FDM the multi-bit PSFCH transmission with separate single bit PSFCHs for other groupcast PSSCH. In some aspects, the receiving UE may send different multi-bit PSFCH to different source UEs (e.g., the UE may not multiplex PSFCHs between different source UEs).

Figure 6:
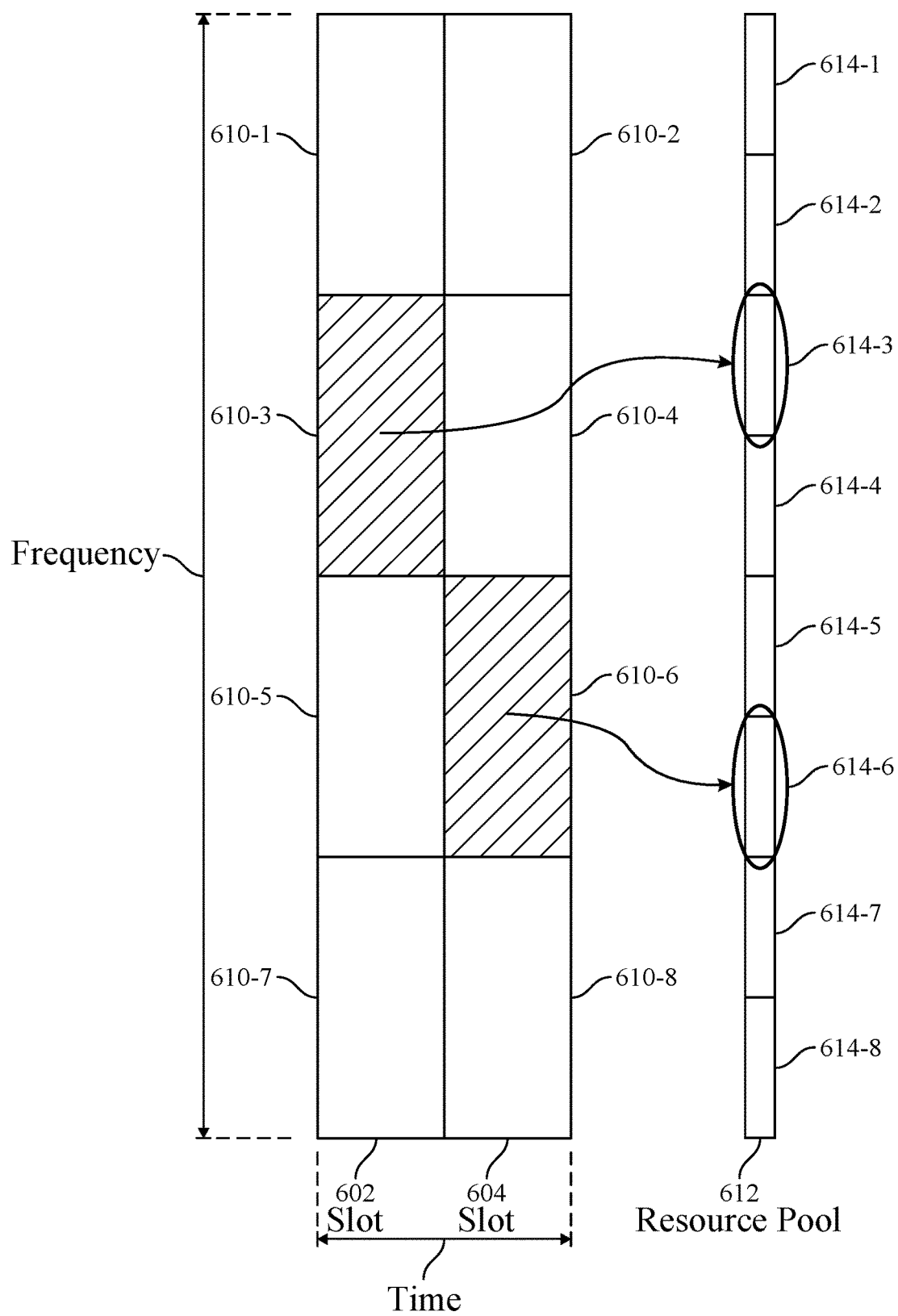
FIG. 6 illustrates an example of selecting a physical sidelink feedback channel (PSFCH) resource for a multi-bit PSFCH transmission, in accordance with certain aspects of the present disclosure.

Aspects presented herein provide techniques for selecting a PSFCH resource (within a resource set) to use for a multi-bit PSFCH transmission. FIG. 6 depicts a reference example of selecting a PSFCH resource for a multi-bit PSFCH transmission, according to certain aspects of the present disclosure. As shown, the UE is configured with a PSFCH resource pool 612 (also referred to a set of PSFCH resources) for PSCCH/PSSCH slots 602, 604 (e.g., period-PSFCHresource=2). The PSFCH resource pool 612 may be similar to PSFCH resource pool 512, except that the PSFCH resources in PSFCH resource pool 612 may be based on PUCCH format 2. Each slot 602, 604 includes four subchannels 610 (e.g., similar to slots 502, 504 in FIG. 5), and each subchannel 610 is associated with a sub-resource pool 614 (also referred to a subset of PSFCH resources) (e.g., similar to the association of subchannels 510 to sub-resource pools 514 in FIG. 5).

In certain aspects, the receiving UE can select a PSFCH resource from the sub-resource pool 614, which corresponds to the subchannel 610 in which the SCI (e.g., SCI-1) is received in. With reference to FIG. 6 for example, assuming the SCI is received in subchannel 610-3 (of slot 602), the receiving UE may select a PSFCH resource from sub-resource pool 614-3. In another example, assuming the SCI is received in subchannel 610-6 (of slot 604), the receiving UE may select a PSFCH resource from sub-resource pool 614-6.

One challenge with the example PSFCH resource selection depicted in FIG. 6 is that, in scenarios where multiple PSSCHs are transmitted to the same receiving UE, it may be unclear to the UE which PSFCH resource to use for the multi-bit PSFCH transmission. In some cases, for example, the receiving UE may not receive all of the PSSCHs transmitted from a transmitting UE. In some instances, the receiving UE may miss a PSSCH due to a SCI miss detection event (e.g., the UE may not detect SCI-1/SCI-2 corresponding to the PSSCH). In some instances, the receiving UE may miss a PSSCH due to half duplex operation (e.g., if the receiving UE is half duplex, it may not be able to receive PSCCH/PSSCH in a slot if it is also transmitting during that slot). Note that, in some aspects described herein, the UE may be able to assume that, within a given sot, there will not be a FDM PSCCH/PSSCH to the same receiving UE for unicast.

To address this ambiguity, aspects provide techniques that enable the receiving UE to determine a PSFCH resource set (e.g., PSFCH sub-resource pool 614) in scenarios where multiple PSSCH transmissions are transmitted to the receiving UE.

Figure 7:
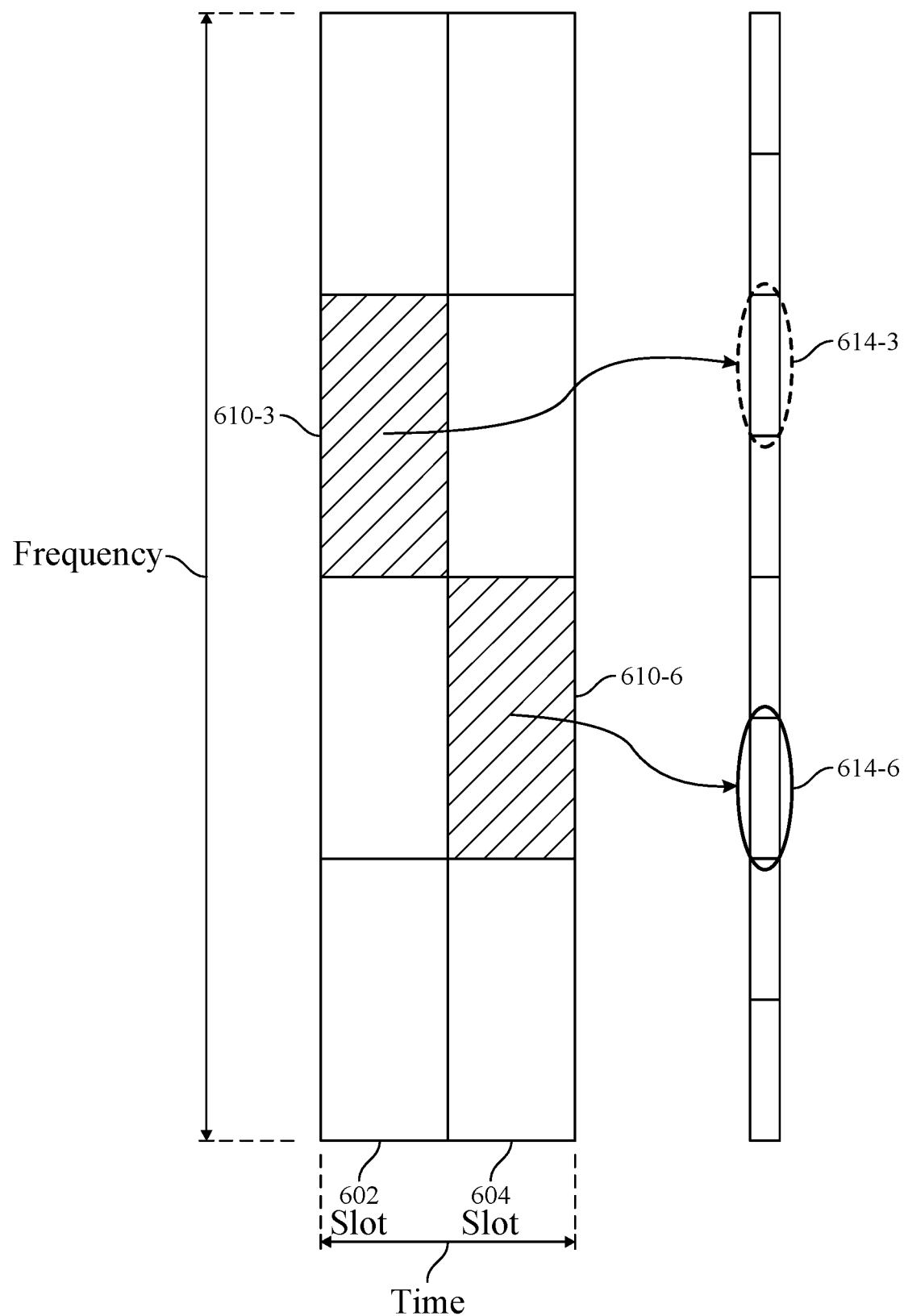
FIG. 7 illustrates another example of selecting a PSFCH resource for a multi-bit PSFCH transmission, in accordance with certain aspects of the present disclosure.

In some aspects, the receiving UE may use the PSFCH sub-resource pool 614 corresponding to the latest received SCI when selecting a PSFCH resource for the multi-bit PSFCH. FIG. 7 depicts a reference example of selecting a PSFCH resource for a multi-bit PSFCH transmission, according to certain aspects of the present disclosure. Here, the UE may receive a first SCI in subchannel 610-3 (of slot 602), corresponding to PSFCH sub-resource pool 614-3. At a subsequent point in time, the UE may receive a second SCI in subchannel 610-6 (of slot 604), corresponding to PSFCH sub-resource pool 614-6. In this example, the receiving UE may select a PSFCH resource from PSFCH sub-resource pool 614-6 for the multi-bit PSFCH transmission (e.g., acknowledging the PSSCH transmission in subchannel 610-3 of slot 602 and the PSSCH transmission in subchannel 610-6 of slot 604), since PSFCH sub-resource pool 614-6 corresponds to the latest received SCI in subchannel 610-6 (of slot 604).

In aspects where the receiving UE uses the PSFCH sub-resource pool 614 corresponding to the latest received SCI for the multi-bit PSFCH, the transmitting UE may perform hypothesis decoding, e.g., in cases the receiving UE misses the later sidelink transmission. In some aspects, the hypothesis may be associated with the codebook size of the PSFCH transmission.

For example, in one aspect, a semi-static codebook can be supported for sidelink communications. With a semi-static codebook, the receiving UE may generate one HARQ-ACK (e.g., ACK/NACK) bit for each of the slots associated with the current PSFCH reporting occasion. The semi-static codebook for sidelink may be similar to the Uu interface semi-static codebook, except that the set of K1 may be based on the PSSCH to PSFCH timing association instead of K1 being indicated in downlink control information (DCI)/SCI.

With a semi-static codebook design, the hypothesis of the transmitting UE may be of the same codebook size as the semi-static codebook. Consider a reference example in which the transmitting UE sends two PSCCH/PSSCH transmissions to the receiving UE. Assuming the semi-static codebook size is 2 (and 2 slots map to one PSFCH), the transmitting UE may first try the 2nd resource set for PSFCH (e.g., the PSFCH resource set associated with the 2nd transmitted PSSCH in slot 604), assuming 2 bits of feedback. If the transmitting UE is not able to decode with the 2nd resource set, the transmitting UE may then try the 1st resource set for PSFCH (e.g., the PSFCH resource set associated with the $2^{nd}$ transmitted PSSCH in slot 602), assuming 2 bits of feedback. In some aspects, the hypothesis decoding can be performed in parallel.

In one aspect, a dynamic codebook can be supported for sidelink communications. With a dynamic codebook, a downlink assignment index (DAI) counter and DAI total can be added to SCI for the receiving UE, where the DAI field indicates the size of the dynamic codebook. With a dynamic codebook design, the hypothesis of the transmitting UE may be based on codebook size determined from the DAI field in SCI. Consider a reference example in which the transmitting UE sends two PSCCH/PSSCH transmissions to the receiving UE. In this example, the transmitting UE may first try the 2nd resource set (e.g., sub-resource pool 614-6) for PSFCH, assuming 2 bits feedback. If the transmitting UE is not able to decode with the 2nd resource set, the transmitting UE can then try the 1st resource set (e.g., sub-resource pool 614-3) for PSFCH, assuming 1 bit feedback. In some aspects, the hypothesis decoding can be performed in parallel.

In some aspects, the receiving UE may determine a PSFCH sub-resource pool 614 for the multi-bit PSFCH, based on a resource indication (or resource indicator) (e.g., similar to primary resource indicator (PRI) in Uu interface). The resource indication may be included in SCI (e.g., SCI-1, SCI-2), and may indicate the sub-resource pool to be used for the PSFCH transmission. The resource indication may indicate and/or include information on which subset of PSFCH resources (e.g., PSFCH sub-resource pool 614) is being used, as opposed to indicating which PSFCH resource within the subset of PSFCH resources is being used (e.g., as in the current Uu interface). By indicating the subset of PSFCH resources (e.g., PSFCH sub-resource pool 614), aspects can reduce the number of bits within the signaling.

Figure 8:
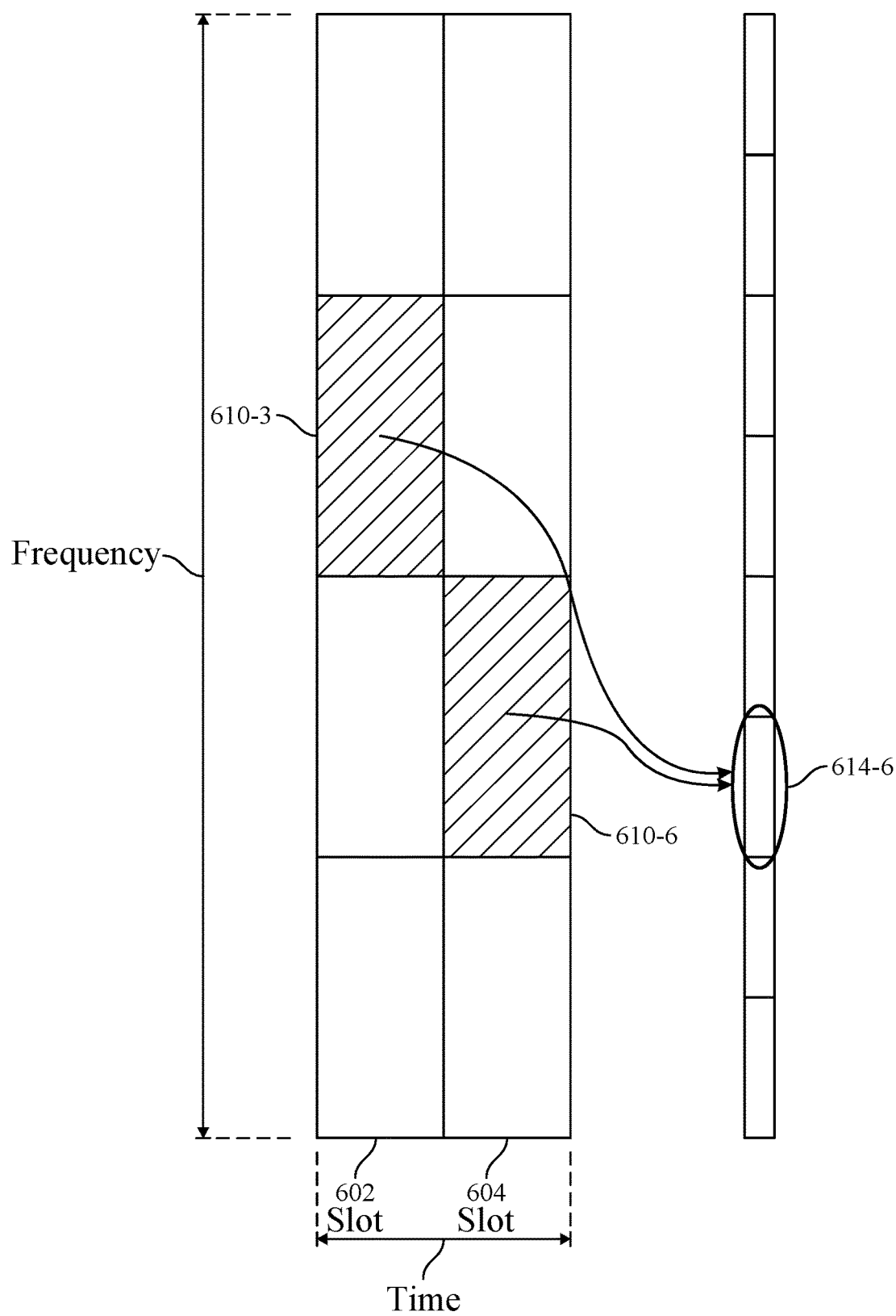
FIG. 8 illustrates another example of selecting a PSFCH resource for a multi-bit PSFCH transmission, in accordance with certain aspects of the present disclosure.

In some aspects, the same resource indicator can be indicated from multiple PSSCH. As shown in the example PSFCH resource selection of FIG. 8, the resource indicator of SCI received in subchannel 610-3 and the resource indicator of SCI received in subchannel 610-6 indicate the same sub-resource pool 614-6.

Alternatively, in some aspects, the resource indicator can indicate different PSFCH sub-resource pools 614, and the receiving UE can use the latest received resource indicator to determine the PSFCH sub-resource pool 614 for the multi-bit PSFCH. This aspect may be similar to determining the resource based on the current DL grant.

In some aspects, the UE may be configured with a number of PSFCH resources, and the UE may perform resource selection based on the resource indication (e.g., three bits) and hashing (remaining degrees of freedom). In scenarios where there are more sub-resource pools than can be indicated by the resource indication, the UE can be configured to select a subset of the sub-resource pools. In one aspect, this sub-selection can be pre-configured for the UE (based on the PRI), hardcoded, or determined from a hash of the source ID. To support backward compatibility, the transmitting UE can restrict the PSSCH resource usage, so that the selected resource set from the available resource sets corresponds to an occupied subchannel. In some aspects, the available resource sets (e.g., available sub-resource pools) can be source ID and/or destination ID dependent. Additionally, the available resource sets can be function of time, e.g., to avoid persistent collision across UEs.

Aspects also provide techniques that enable the receiving UE to determine a PSFCH resource (within a PSFCH sub-resource pool 614) to use for a multi-bit PSFCH transmission, according to certain aspects of the present disclosure. In some aspects, the receiving UE may select a PSFCH resource (e.g., a set of RBs) within a given PSFCH sub-resource pool 614, based on the size of the payload and coding rate. For example, in cases where the multi-bit PSFCH design is based on PUCCH format 2, the UE can select the number of RBs that is large enough to carry the payload to satisfy a predefined coding rate criteria.

Figure 9A:
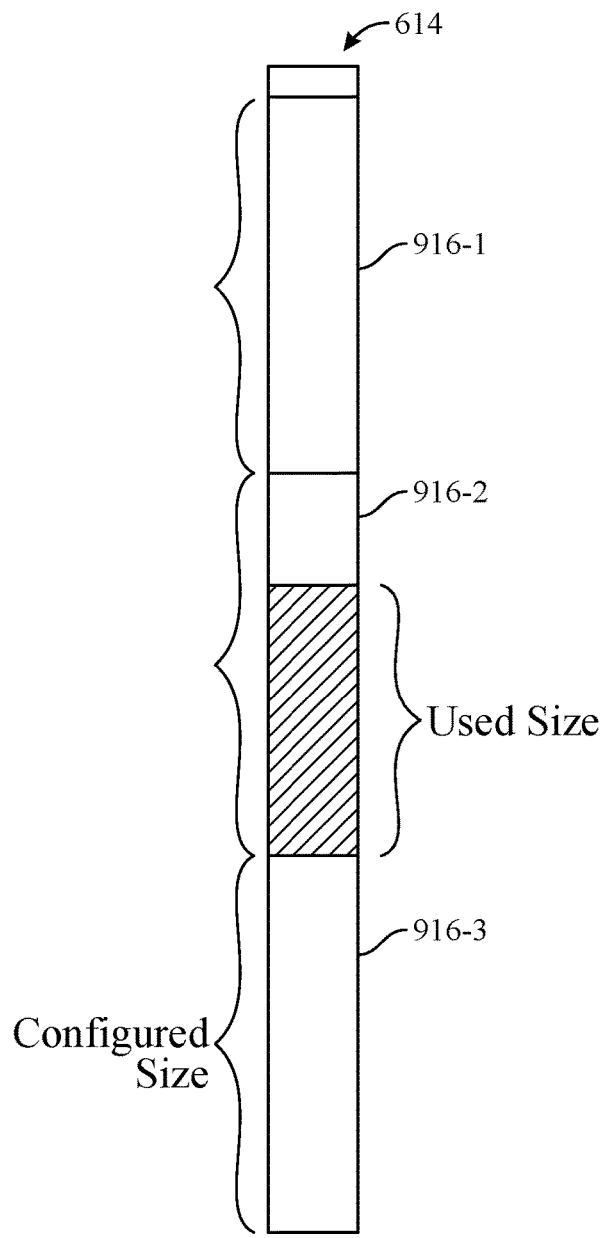
FIG. 9A illustrates an example of PSFCH resource selection within a PSFCH sub-resource pool, in accordance with certain aspects of the present disclosure.

FIG. 9A illustrates one reference example of PSFCH resource selection within a PSFCH sub-resource pool 614, according to certain aspects of the present disclosure. In this example, assuming the sub-resource pool 614 includes a number of RBs (e.g., 6 RBs), the sub-resource pool may be divided by the radio resource control (RRC) configured size of the PSFCH (e.g., 2 RBs), into RB subsets 916-1, 916-2, and 916-3, each including 3 RBs. The UE may then select one of the RB subsets (e.g., RB subset 916-2) to use as the PSFCH resource. In one aspect, the UE may select one of the RB subsets (e.g., RB subset 916-2), based on transmitter ID. In one aspect, the UE may also use a subset of the RBs in the selected RB subset 916, based on the size of the feedback. For example, the receiving UE can use the starting RBs in the selected resource (e.g., RB subset 916-2) if the number of bits to transmit is less than the RRC configured size of the PSFCH.

Figure 9B:
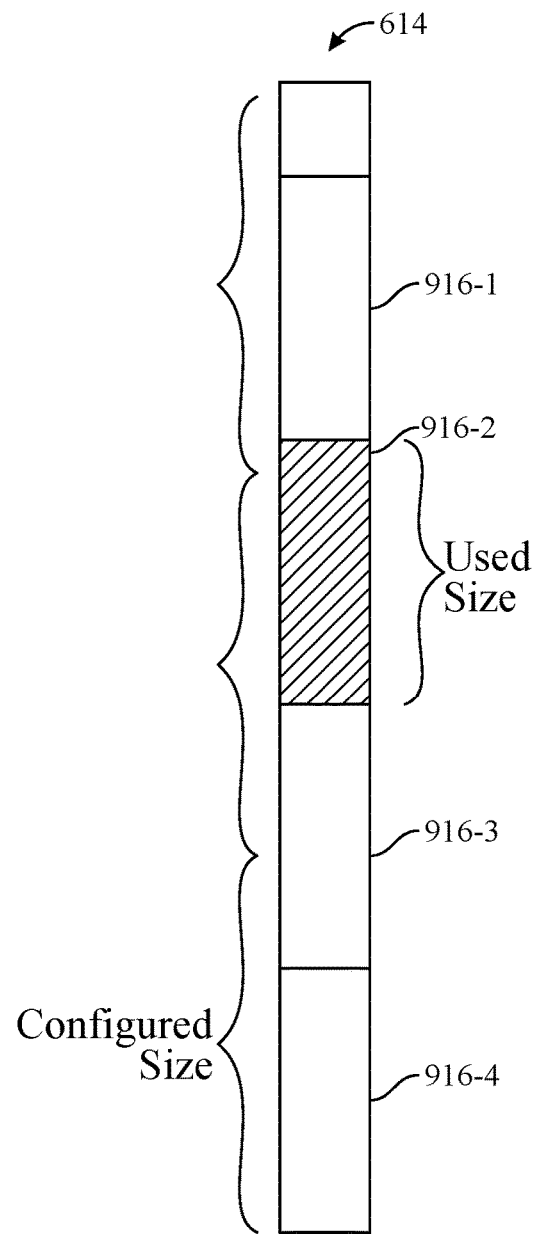
FIG. 9B illustrates another example of PSFCH resource selection within a PSFCH sub-resource pool, in accordance with certain aspects of the present disclosure.

FIG. 9B illustrates another reference example of PSFCH resource selection within a PSFCH sub-resource pool, according to certain aspects of the present disclosure. In this example, the UE may determine the number of RBs that are needed for the PSFCH transmissions. The UE may then divide the sub-resource pool 614 into a number of RB subsets 916 1-4, where the number of RB subsets 916 is based on the determined number of RBs needed for the PSFCH transmission. In FIG. 9B, for example, assuming the UE needs 2 RBs for the PSFCH transmission, the UE can divide the sub-resource pool 614 (including 8 RBs) into 4 RB subsets 916 1-4, each including 2 RBs, and select one of the RB subsets (e.g., RB subset 916-2) to use for the PSFCH transmission. In one aspect, the UE may select one of the RB subsets (e.g., RB subset 616-2), based on transmitter ID.

Figure 10:
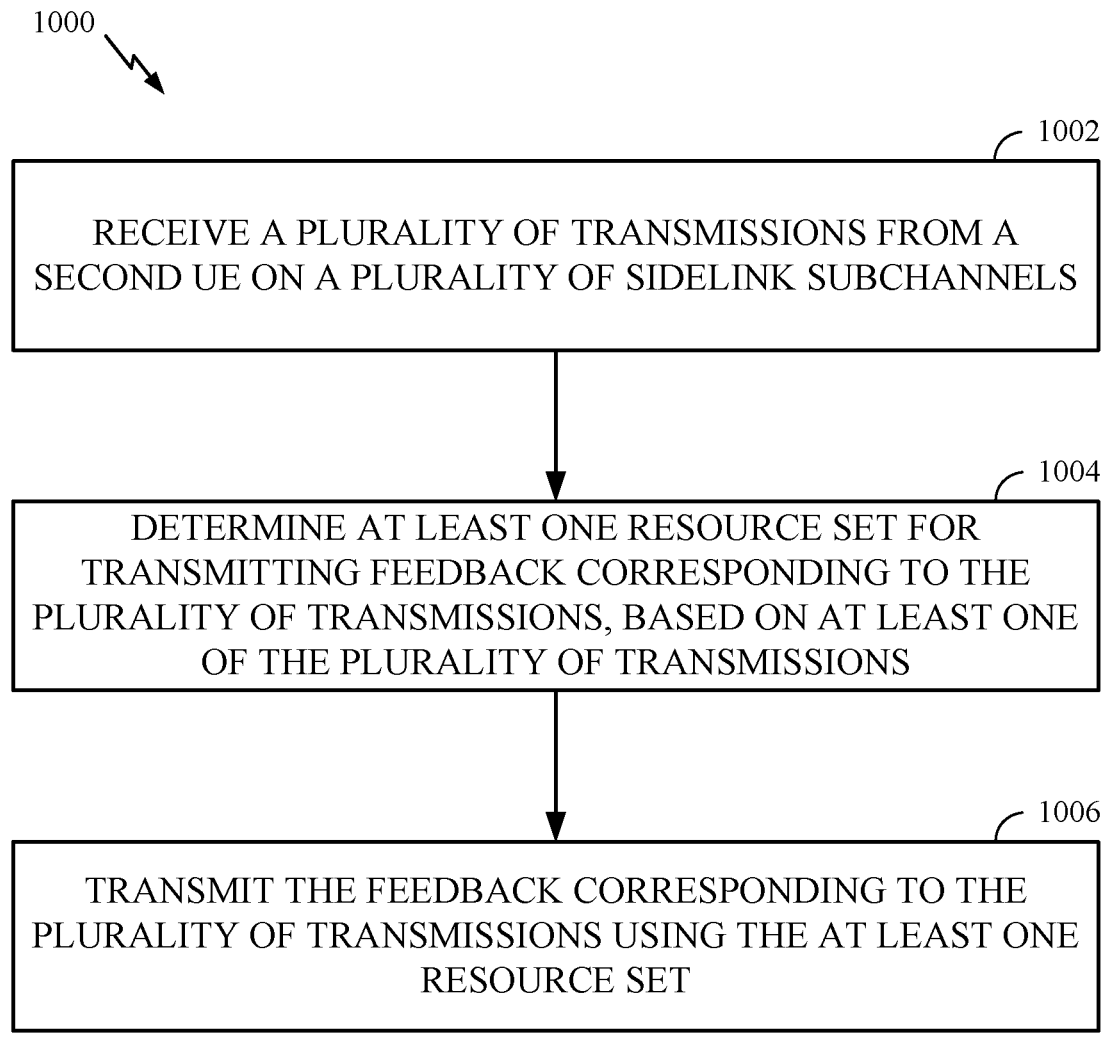
FIG. 10 is a flow diagram illustrating example operations for wireless communication by a UE, in accordance with certain aspects of the present disclosure.

FIG. 10 is a flow diagram illustrating example operations 1000 for wireless communication, in accordance with certain aspects of the present disclosure. The operations 1000 may be performed, for example, by a (receiving) (first) UE (e.g., such as the UE 120a in the wireless communication network 100). The operations 1000 may be implemented as software components that are executed and run on one or more processors (e.g., controller/processor 280 of FIG. 2). Further, the transmission and reception of signals by the UE in operations 1000 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1000 may begin, at 1002, where the (first) UE receives a plurality of transmissions from another (second) UE on a plurality of sidelink subchannels (e.g., subchannels 610). Referring to FIG. 6, for example, the UE may receive a first PSSCH on subchannel 610-3 during slot 602 and a second PSSCH on subchannel 610-6 during slot 604.

At 1004, the UE determines at least one resource set (e.g., sub-resource pool 614) for transmitting feedback corresponding to the plurality of transmissions, based on at least one of the plurality of transmissions. Referring to FIG. 6, for example, the UE may select one of the sub-resource pools 614 within PSFCH resource pool 612 to use for selecting a PSFCH resource for the multi-bit HARQ-ACK transmission to acknowledge the PSSCH transmissions in slots 602 and 604.

At 1006, the UE transmits (to the other UE) the feedback corresponding to the plurality of transmissions using the at least one resource set. For example, the UE can transmit the multi-bit HARQ-ACK using a single PSFCH resource (e.g., RB subset 916) from within the determined sub-resource pool 614. The feedback may include multiple bits, where each bit indicates an ACK or NACK for a different one of the transmissions.

In some aspects, the transmission of the feedback (at 1006) may be based on a transmission mode associated with the plurality of transmissions. For example, the operations 1000 may further include receiving SCI from the (second) UE, where the SCI indicates a transmission mode associated with the plurality of transmissions. In one aspect, the (first) UE may transmit (at 1006) a single PSFCH comprising the multiple bits when the transmission mode is unicast. The single PSFCH may be based on PUCCH format 2 with one symbol (e.g., one symbol PUCCH format 2). In one aspect, the (first) UE may transmit (at 1006) multiple PSFCHs, each corresponding to one of the multiple bits, when the transmission mode is groupcast or zone based.

In some aspects, the operations 1000 may further include receiving multiple SCI (e.g., from the second UE), where each SCI corresponds to (i) one of the plurality of transmissions and (ii) one of multiple resource sets to use for transmitting feedback for the respective transmission corresponding to the SCI. With reference to FIG. 6, for example, the (first) UE can receive a first SCI for a first PSSCH in subchannel 610-3 of slot 602 and a second SCI for a second PSSCH in subchannel 610-6 of slot 604. The first SCI may correspond to sub-resource pool 614-3 (for the transmission of feedback to acknowledge the first PSSCH) and the second SCI may correspond to sub-resource pool 614-6 (for the transmission of feedback to acknowledge the second PSSCH).

In some aspects, the (first) UE, at 1004, can determine the at least one resource set by (i) determining which of the multiple SCI is a latest received SCI (e.g., SCI received in subchannel 610-6 of slot 604 in FIG. 7) and (ii) setting the resource set (e.g., sub-resource pool 614-6 in FIG. 7) associated with the latest received SCI as the at least one resource set for transmitting the feedback corresponding to the plurality of transmissions.

In some aspects, the (first) UE, at 1004, can determine the at least one resource set, based on a resource indicator in each of the multiple SCI. For example, the operations 1000 may further include receiving a resource indicator in each of the multiple SCI (e.g., PRI in SCI received in subchannel 610-3 of slot 602 in FIG. 8, and PRI in SCI received in subchannel 610-6 of slot 604 in FIG. 8). Each resource indicator can indicate the resource set (e.g., sub-resource pool 614-6 of FIG. 8) to use for transmitting the feedback corresponding to the plurality of transmissions.

In some aspects, the operations 1000 can further include determining the feedback for the plurality of transmissions, based on a DAI field included in one or more of the multiple SCI. For example, the DAI field can be associated with a dynamic codebook, where the DAI field indicates a DAI counter and DAI total. In some aspects, the operations 1000 can further include determining the feedback for the plurality of transmission, based on a semi-static codebook.

In some aspects, the operations 1000 further include determining a set of RBs within the at least one resource set for transmitting the feedback corresponding to the plurality of transmissions. In one aspect, for example, the (first) UE can determine an amount of the RBs within the at least one resource set, based on a size of the PSFCH (e.g., the RRC configured PSFCH size), and select a subset of the amount of RBs as the set of RBs (e.g., RB subset 916-2 in FIG. 9A), based on a size of the feedback.

In another aspect, the (first) UE can determine an amount of RBs within the at least one resource set, based on a size of the feedback (e.g., 2 RBs). The number of the subset of RBs (e.g., four RB subsets 916 1-4 in FIG. 9B) can be based on the determined amount of RBs. The amount of RBs in each subset of RBs may be equal to the size of the feedback.

Figure 11:
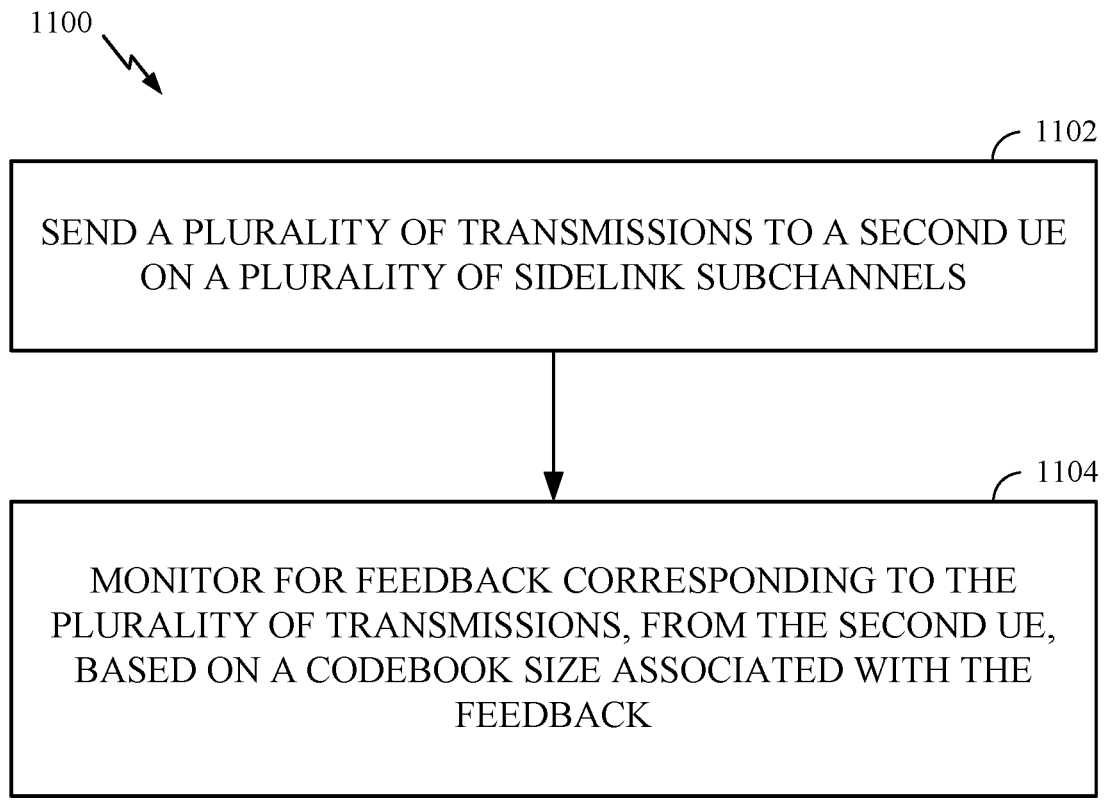
FIG. 11 is a flow diagram illustrating example operations for wireless communication by a UE, in accordance with certain aspects of the present disclosure.

FIG. 11 is a flow diagram illustrating example operations 1100 for wireless communication, in accordance with certain aspects of the present disclosure. The operations 1100 may be performed, for example, by a (transmitting) UE (e.g., such as the UE 120*b* in the wireless communication network 100). The operations 1100 may be implemented as software components that are executed and run on one or more processors (e.g., controller/processor 280 of FIG. 2). Further, the transmission and reception of signals by the UE in operations 1100 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1100 may begin, at 1102, where the (transmitting) UE sends a plurality of transmissions to another (receiving) UE on a plurality of sidelink subchannels. At 1104, the UE monitors for feedback corresponding to the plurality of transmissions, from the other (receiving) UE, based on a codebook size associated with the feedback. The feedback, for example, can include a PSFCH with multiple bits, where each of the multiple bits indicates an ACK or NACK for a different one of the plurality of transmissions.

In some aspects, a semi-static codebook can be configured for the feedback. In these aspects, monitoring for the feedback (at 1104) may include (i) setting the codebook size associated with the feedback to a codebook size of the semi-static codebook and (ii) performing a hypothesis decoding operation, based on the codebook size associated with the feedback.

In some aspects, a dynamic codebook can be configured for the feedback. In these aspects, monitoring for the feedback (at 1104) may include (i) determining the codebook size based on an indication in SCI for each of the plurality of transmissions and (ii) performing a hypothesis decoding operation, based on the codebook size.

Figure 12:
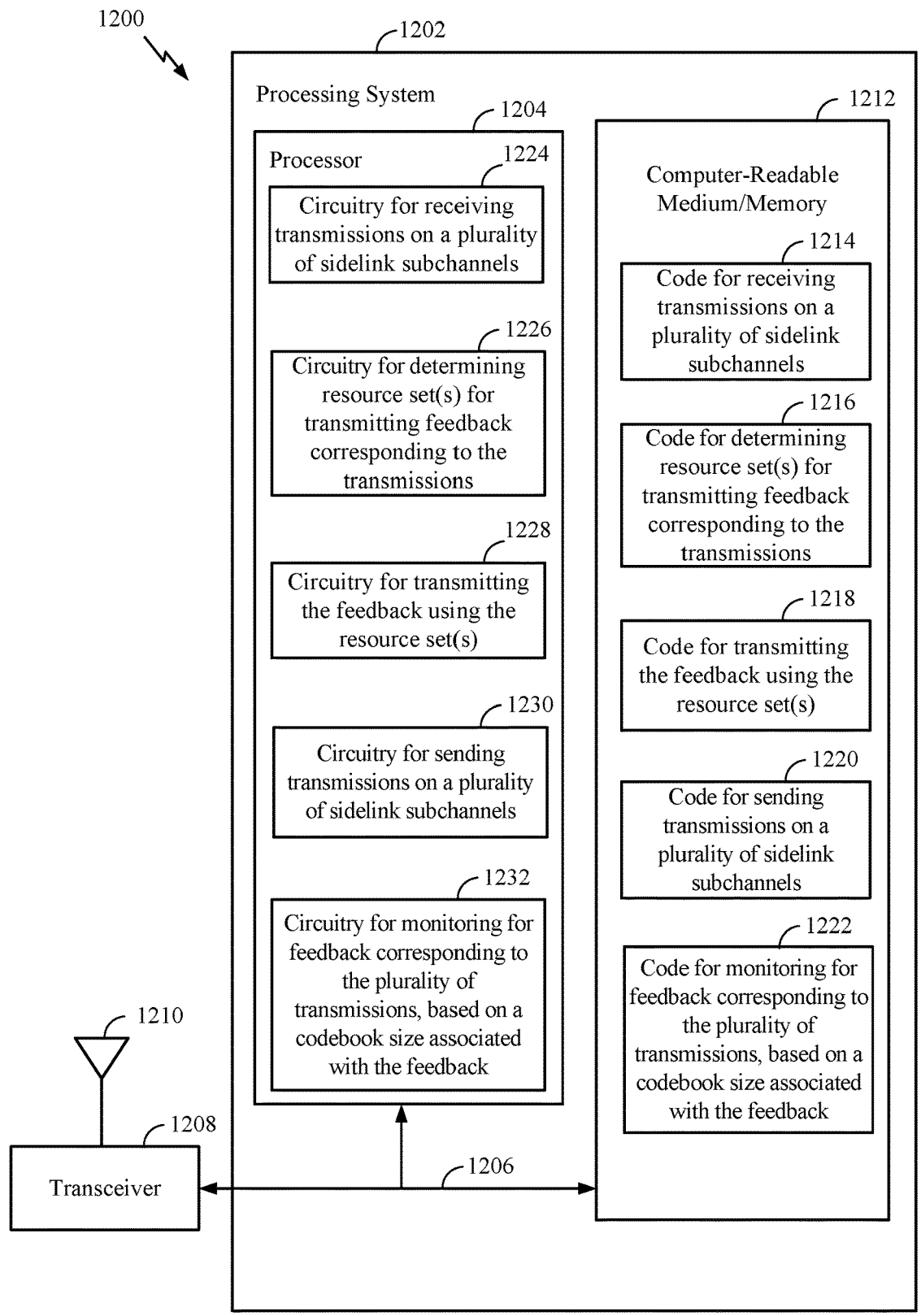
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIGS. 10 and 11. The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIGS. 10 and 11, or other operations for performing the various techniques discussed herein for supporting multi-bit PSFCH. In certain aspects, computer-readable medium/memory 1212 stores code 1214 for receiving a plurality of transmissions from a second UE on a plurality of sidelink subchannels; code 1216 for determining at least one resource set for transmitting feedback corresponding to the plurality of transmissions, based on at least one of the plurality of transmissions; code 1218 for transmitting the feedback corresponding to the plurality of transmissions using the at least one resource set; code 1220 for sending a plurality of transmissions to a second UE on a plurality of sidelink subchannels; and code 1222 for monitoring for feedback corresponding to the plurality of transmissions, based on a codebook size associated with the feedback, etc.

In certain aspects, the processor 1204 has circuitry configured to implement the code stored in the computer-readable medium/memory 1212. The processor 1204 includes circuitry 1224 for receiving a plurality of transmissions from a second UE on a plurality of sidelink subchannels; circuitry 1226 for determining at least one resource set for transmitting feedback corresponding to the plurality of transmissions, based on at least one of the plurality of transmissions; circuitry 1228 for transmitting the feedback corresponding to the plurality of transmissions using the at least one resource set; circuitry 1230 for sending a plurality of transmissions to a second UE on a plurality of sidelink subchannels; and circuitry 1232 for monitoring for feedback corresponding to the plurality of transmissions, based on a codebook size associated with the feedback, etc.

Example Aspects

The following example aspects are provided by way of illustration. Each of the following aspects may be combined with other aspects, implementations, or embodiments presented within the present disclosure.

In a first aspect, a method for wireless communication by a first UE, includes receiving a plurality of transmissions from a second UE on a plurality of sidelink subchannels; determining at least one resource set for transmitting feedback corresponding to the plurality of transmissions, based on at least one of the plurality of transmissions; and transmitting the feedback corresponding to the plurality of transmissions using the at least one resource set.

In a second aspect, in combination with the first aspect, the feedback comprises a plurality of bits, each of the plurality of bits indicating an acknowledgement (ACK) or negative acknowledgement (NACK) for a different one of the plurality of transmissions.

In a third aspect, in combination with one or more of the first and second aspects, the method further includes receiving sidelink control information (SCI) from the second UE, the SCI indicating a transmission mode associated with the plurality of transmissions, wherein transmitting the feedback is based on the transmission mode.

In a fourth aspect, in combination with one or more of the first through third aspects, transmitting the feedback includes transmitting a single physical sidelink feedback channel (PSFCH) comprising the plurality of bits, when the transmission mode is unicast.

In a fifth aspect, in combination with one or more of the first through fourth aspects, the single PSFCH is based on a physical uplink control channel (PUCCH) format 2 with one symbol.

In a sixth aspect, in combination with one or more of the first through fifth aspects, transmitting the feedback comprises transmitting a plurality of physical sidelink feedback channels (PSFCHs), each comprising one of the plurality of bits, when the transmission mode is groupcast or zone based.

In a seventh aspect, in combination with one or more of the first through sixth aspects, the method further includes receiving a plurality of sidelink control information (SCI), wherein each SCI corresponds to one of the plurality of transmissions and one of a plurality of resource sets to use for transmitting feedback for the respective transmission corresponding to the SCI.

In an eighth aspect, in combination with one or more of the first through seventh aspects, determining the at least one resource set comprises: determining which of the plurality of SCI is a latest received SCI; and setting the resource set associated with the latest received SCI as the at least one resource set for transmitting the feedback corresponding to the plurality of transmissions.

In a ninth aspect, in combination with one or more of the first through eighth aspects, each SCI comprises a downlink assignment index (DAI) field, the method further comprising determining the feedback for the plurality of the transmissions based in part on the DAI field in one or more of the plurality of SCI.

In a tenth aspect, in combination with one or more of the first through ninth aspects, the method further includes determining the feedback for the plurality of the transmissions based on a semi-static codebook.

In an eleventh aspect, in combination with one or more of the first through tenth aspects, the method further includes receiving a plurality of sidelink control information (SCI), wherein each SCI corresponds to one of the plurality of transmissions and indicates a resource set to use for transmitting the feedback corresponding to the plurality of transmissions.

In a twelfth aspect, in combination with one or more of the first through eleventh aspects, determining the at least one resource set comprises determining a set of resource blocks (RBs) within the at least one resource set for transmitting the feedback corresponding to the plurality of transmissions.

In a thirteenth aspect, in combination with one or more of the first through twelfth aspects, determining the set of RBs comprises: determining an amount of the RB(s) within the at least one resource set, based on a size of a physical sidelink feedback channel (PSFCH); and selecting a subset of the amount of RBs as the set of RBs, based on a size of the feedback.

In a fourteenth aspect, in combination with one or more of the first through thirteenth aspects, determining the set of RBs comprises determining an amount of the RBs within the at least one resource set, based on a size of the feedback, wherein a number of the subset of RBs is based on the determined amount of RBs.

In a fifteenth aspect, a method for wireless communication by a first UE includes sending a plurality of transmissions to a second UE on a plurality of sidelink subchannels; and monitoring for feedback corresponding to the plurality of transmissions, from the second UE, based on a codebook size associated with the feedback.

In a sixteenth aspect, in combination with the fifteenth aspect, a semi-static codebook is configured for the feedback; and monitoring for the feedback comprises: setting the codebook size associated with the feedback to a codebook size of the semi-static codebook; and performing a hypothesis decoding operation, based on the codebook size associated with the feedback.

In a seventeenth aspect, in combination with the fifteenth aspect, a dynamic codebook is configured for the feedback; and monitoring for the feedback comprises: determining the codebook size based on an indication in SCI for each of the plurality of transmissions; and performing a hypothesis decoding operation, based on the codebook size.

In an eighteenth aspect, in combination with one or more of the fifteenth through seventeenth aspects, the feedback comprises a physical sidelink feedback channel comprising a plurality of bits, each of the plurality bits indicating an acknowledgement or negative acknowledgment for a different one of the plurality of transmissions.

In a nineteenth aspect, an apparatus comprises a processing system, a receiver, and a transmitter, the apparatus being configured to perform the method according to any of the first through fourteenth aspects.

In a twentieth aspect, an apparatus comprises a processing system, a receiver, and a transmitter, the apparatus being configured to perform the method according to any of the fifteenth through eighteenth aspects.

In a twenty-first aspect, an apparatus comprises means for performing the method according to any of the first through fourteenth aspects.

In a twenty-second aspect, an apparatus comprises means for performing the method according to any of the fifteenth through eighteenth aspects.

In a twenty-third aspect, a non-transitory computer-readable medium comprises computer-executable instructions that, when executed by one or more processors of a processing system, cause a first UE to perform the method according to any of the first through fourteenth aspects.

In a twenty-fourth aspect, a non-transitory computer-readable medium comprises computer-executable instructions that, when executed by one or more processors of a processing system, cause a first UE to perform the method according to any of the fifteenth through eighteenth aspects.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 10 and/or FIG. 11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a first user equipment (UE), comprising:
   receiving a plurality of sidelink control information (SCI) from a second UE, each SCI of the plurality of SCI (i) being received on a respective sidelink subchannel of a plurality of sidelink subchannels, (ii) comprising a respective transmission of a plurality of transmissions from the second UE, and (iii) indicating a same resource set of a plurality of resource sets to use for transmitting feedback corresponding to the plurality of transmissions;
   determining the same resource set for transmitting the feedback corresponding to the plurality of transmissions based on at least one of the plurality of SCI; and
   transmitting the feedback corresponding to the plurality of transmissions using the same resource set, wherein:
   the feedback comprises a single physical sidelink feedback channel (PSFCH) when a transmission mode associated with the plurality of transmissions is unicast;
   the single PSFCH comprises a plurality of resource blocks comprising a plurality of bits and spanning a single symbol; and
   each of the plurality of bits indicates an acknowledgment (ACK) or negative acknowledgement (NACK) for a different one of the plurality of transmissions.

2. The method of claim 1, wherein each SCI further indicates a transmission mode associated with the respective transmission of the SCI.

3. The method of claim 1, wherein the single PSFCH is based on a physical uplink control channel (PUCCH) format 2 with one symbol.

4. The method of claim 1, wherein the feedback comprises a plurality of PSFCHs, each comprising one of the plurality of bits, when the transmission mode is groupcast or zone based.

5. The method of claim 1, wherein each SCI comprises a downlink assignment index (DAI) field, the method further comprising determining the feedback for the plurality of the transmissions based in part on the DAI field in one or more of the plurality of SCI.

6. The method of claim 1, further comprising determining the feedback for the plurality of the transmissions based on a semi-static codebook.

7. The method of claim 1, wherein determining the same resource set comprises determining a set of resource blocks (RBs) within the same resource set for transmitting the feedback corresponding to the plurality of transmissions.

8. The method of claim 7, wherein determining the set of RBs comprises:
   determining an amount of RBs within the same resource set, based on a size of a PSFCH; and
   selecting a subset of the amount of RBs as the set of RBs, based on a size of the feedback.

9. The method of claim 7, wherein determining the set of RBs comprises determining an amount of RBs within the same resource set, based on a size of the feedback, wherein a number of the set of RBs is based on the determined amount of RBs.

10. An apparatus for wireless communication, comprising:
    a receiver configured to receive a plurality of sidelink control information (SCI) from another apparatus, each SCI of the plurality of SCI (i) being received on a respective sidelink subchannel of a plurality of sidelink subchannels, (ii) comprising a respective transmission of a plurality of transmissions from the other apparatus, and (iii) indicating a same resource set of a plurality of resource sets to use for transmitting feedback corresponding to the plurality of transmissions;
    at least one processor configured to determine the same resource set for transmitting the feedback corresponding to the plurality of transmissions based on at least one of the plurality of SCI;
    a transmitter configured to transmit the feedback corresponding to the plurality of transmissions using the same resource set, wherein:
    the feedback comprises a single physical sidelink feedback channel (PSFCH) when a transmission mode associated with the plurality of transmissions is unicast;
    the single PSFCH comprises a plurality of resource blocks comprising a plurality of bits and spanning a single symbol; and
    each of the plurality of bits indicates an acknowledgment (ACK) or negative acknowledgement (NACK) for a different one of the plurality of transmissions; and
    a memory coupled to the at least one processor.

11. The apparatus of claim 10, wherein each SCI further indicates a transmission mode associated with the respective transmission of the SCI.

12. The apparatus of claim 10, wherein the single PSFCH is based on a physical uplink control channel (PUCCH) format 2 with one symbol.

13. The apparatus of claim 10, wherein the feedback comprises a plurality of PSFCHs, each comprising one of the plurality of bits, when the transmission mode is groupcast or zone based.

14. The apparatus of claim 10, wherein the at least one processor is configured to determine a set of resource blocks (RBs) within the same resource set for transmitting the feedback corresponding to the plurality of transmissions.

15. The apparatus of claim 14, wherein determining the set of RBs comprises:
 (i) determining an amount of RBs within the same resource set, based on a size of a PSFCH; and
 (ii) selecting a subset of the amount of RBs as the set of RBs, based on a size of the feedback.

16. The apparatus of claim 14, wherein determining the set of RBs comprises determining an amount of RBs within the same resource set, based on a size of the feedback, wherein a number of the set of RBs is based on the determined amount of RBs.

17. A method for wireless communications by a first user equipment (UE), comprising:
 sending a plurality of sidelink control information (SCI) to a second UE, each SCI of the plurality of SCI (i) being sent on a respective sidelink subchannel of a plurality of sidelink subchannels, (ii) comprising a respective transmission of a plurality of transmissions to the second UE, and (iii) indicating a same resource set of a plurality of resource sets to use for transmitting feedback corresponding to the plurality of transmissions; and
 monitoring for the feedback corresponding to the plurality of transmissions, from the second UE, based on a codebook size associated with the feedback, wherein:
  the feedback comprises a single physical sidelink feedback channel (PSFCH), which comprises a plurality of resource blocks comprising a plurality of bits and spanning a single symbol within the same resource set; and
  each of the plurality of bits indicates an acknowledgment (ACK) or negative acknowledgement (NACK) for a different one of the plurality of transmissions.

18. The method of claim 17, wherein:
a semi-static codebook is configured for the feedback; and
monitoring for the feedback comprises:
 setting the codebook size associated with the feedback to a codebook size of the semi-static codebook; and
 performing a hypothesis decoding operation, based on the codebook size associated with the feedback.

19. The method of claim 17, wherein:
a dynamic codebook is configured for the feedback; and
monitoring for the feedback comprises:
 determining the codebook size based on an indication in SCI for each of the plurality of transmissions; and
 performing a hypothesis decoding operation, based on the codebook size.

20. The method of claim 17, wherein the single PSFCH is based on a physical uplink control channel (PUCCH) format 2 with one symbol.

21. An apparatus for wireless communication, comprising:
 a transmitter configured to send a plurality of sidelink control information (SCI) to another apparatus, each SCI of the plurality of SCI (i) being sent on a respective sidelink subchannel of a plurality of sidelink subchannels, (ii) comprising a respective transmission of a plurality of transmissions to the other apparatus, and (iii) indicating a same resource set of a plurality of resource sets to use for transmitting feedback corresponding to the plurality of transmissions;
 at least one processor configured to monitor for the feedback corresponding to the plurality of transmissions, from the other apparatus, based on a codebook size associated with the feedback, wherein:
  the feedback comprises a single physical sidelink feedback channel (PSFCH), which comprises a plurality of resource blocks comprising a plurality of bits and spanning a single symbol within the same resource set; and
  each of the plurality of bits indicates an acknowledgment (ACK) or negative acknowledgement (NACK) for a different one of the plurality of transmissions; and
 a memory coupled to the at least one processor.

22. The apparatus of claim 21, wherein:
a semi-static codebook is configured for the feedback; and
monitoring for the feedback comprises:
 setting the codebook size associated with the feedback to a codebook size of the semi-static codebook; and
 performing a hypothesis decoding operation, based on the codebook size associated with the feedback.

23. The apparatus of claim 21, wherein:
a dynamic codebook is configured for the feedback; and
monitoring for the feedback comprises:
 determining the codebook size based on an indication in SCI for each of the plurality of transmissions; and
 performing a hypothesis decoding operation, based on the codebook size.

24. The apparatus of claim 21, wherein the single PSFCH is based on a physical uplink control channel (PUCCH) format 2 with one symbol.

* * * * *